United States Patent [19]

Matlach

[11] Patent Number: 4,659,334

[45] Date of Patent: Apr. 21, 1987

[54] PARTICULATE COMPOSITIONS USED IN PETROLEUM SYSTEMS COMPRISING ENCAPSULATED MATERIALS

[75] Inventor: William J. Matlach, St. Louis, Mo.

[73] Assignee: Petrolite Corporation, St. Louis, Mo.

[21] Appl. No.: 831,390

[22] Filed: Feb. 20, 1986

Related U.S. Application Data

[62] Division of Ser. No. 628,709, Jul. 10, 1984, Pat. No. 4,588,640.

[51] Int. Cl.$^4$ ............... C10L 1/10; C10L 1/14; C10L 1/18; C10L 1/32
[52] U.S. Cl. ............................. 44/51; 44/62; 428/402.21; 428/407; 428/520; 523/201; 523/206; 523/207
[58] Field of Search ............ 428/407, 402.21, 520; 523/201, 206, 207; 44/51, 62; 525/227, 902

[56] References Cited

U.S. PATENT DOCUMENTS

| | | | |
|---|---|---|---|
| 3,911,193 | 10/1975 | Resz et al. | 428/520 |
| 3,930,101 | 12/1975 | Vincent | 428/407 |
| 4,075,134 | 2/1978 | Morehouse et al. | 523/206 |
| 4,156,669 | 5/1979 | Lee | 428/407 |
| 4,156,703 | 5/1979 | Harrop | 525/227 |
| 4,199,486 | 4/1980 | Boessler et al. | 525/902 |
| 4,255,159 | 3/1981 | Miller et al. | 44/62 |
| 4,264,678 | 4/1981 | Nelsen et al. | 525/902 |
| 4,277,384 | 7/1981 | Arkens | 525/902 |
| 4,387,138 | 6/1983 | Gift | 428/520 |
| 4,419,106 | 12/1983 | Miller | 44/62 |
| 4,419,471 | 12/1983 | Nelsen et al. | 525/902 |
| 4,433,073 | 2/1984 | Sand et al. | 523/206 |
| 4,440,908 | 4/1984 | McClain | 428/407 |
| 4,448,586 | 5/1984 | Weidig | 44/62 |
| 4,452,928 | 6/1984 | Trischman et al. | 523/201 |
| 4,455,344 | 6/1984 | Matsuyama et al. | 428/407 |
| 4,511,366 | 4/1985 | Burrows et al. | 44/62 |
| 4,518,509 | 5/1985 | Newberry | 252/8.3 |
| 4,595,395 | 6/1986 | Smith | 44/62 |

FOREIGN PATENT DOCUMENTS 2106915  4/1983  United Kingdom ............... 525/902

*Primary Examiner*—Herbert J. Lilling
*Attorney, Agent, or Firm*—Robert E. Wexler

[57] ABSTRACT

The invention pertains to particulate compositions comprising a mixture of a low melting point petroleum additive and a higher melting point polymer which mixture is then coated with a high melting point polymer. The mixture of the additive and higher melting point polymer has a melting point close to the melting point of the polymer (i.e., significantly higher than the melting point of the additive). The high melting point polymer coating allows the composition to be added to petroleum systems having high temperatures without immediately dissolving, i.e., the compositions are only slowly soluble in hot crude oil. Accordingly, a slow, controlled release is afforded by the compositions of the invention.

12 Claims, No Drawings

PARTICULATE COMPOSITIONS USED IN PETROLEUM SYSTEMS COMPRISING ENCAPSULATED MATERIALS

This is a division, of application Ser. No. 628,709, filed July 10, 1984, now U.S. Pat. No. 4,588,640.

BACKGROUND OF THE INVENTION

1. Field of the Invention

This invention relates to petroleum additive compositions, particularly to compositions which are in particulate form, water insoluble and characterized by slow, controlled oil-solubility at high temperatures and pourability at low temperatures. The invention especially relates to water insoluble, particulate compositions comprising petroleum additives, such as pour point depressants, paraffin inhibitors, corrosion inhibitors, biocides and the like, which compositions are slowly and controllably soluble in petroleum systems at elevated temperatures. The invention further relates to methods of inhibiting paraffin deposition, corrosion, rust, and bacterial and algal growth and a method of reducing the pour point of petroleum systems by virtue of incorporating therein the above-described compositions.

It is known that crude oils and heavier petroleum fractions, such as residual fuel oils, often contain substantial quantities of waxy materials. When such oils are subjected to temperatures below their cloud points, the waxy constituents tend to deposit on cool surfaces or crystallize and agglomerate into a solid gel. The gelling or stiffening of the oil introduces rheological problems which interfere with normal oil production and cause handling problems. High viscosities and high pour points result in additional production costs, such as increased horsepower, increased equipment size and increased fuel usage to heat the crude. Particularly affected by such rheological problems are long distance pipelines and offshore production facilities.

In addition to higher viscosities resulting from the gelling of petroleum, as described above, certain waxy fractions in crude oil may actually deposit directly on cold surfaces as the crude is exposed to cooler temperatures during production. The decrease in solubility of the waxy fraction with decreasing temperature results in wax deposits which reduce the volume of oil which can be produced. The addition of paraffin inhibitors helps to resolve wax deposition, but one of the greatest problems related to the use of paraffin inhibitors in most oilfield environments is the poor physical properties associated with these high molecular weight materials. Most effective treatment chemicals are either high melting solids or high pour point liquids or gels which pose a variety of handling problems in low temperature environments. The solids are handleable at ambient surface temperatures but dissolve too rapidly at high down-hole temperatures. The high molecular weight liquids frequently gel at ambient surface temperatures of 4°–10° C. or below and must be heated or diluted to be useful. Heated storage at the wellhead or dilution with solvents is normally required to allow continuous injection. Normal dilution may require as much as 95 to 98% solvent in order to achieve adequate application of paraffin inhibitor.

In view of the aforementioned problems, an object of the present invention is to provide compositions and methods for treatment of high temperature petroleum systems (i.e. down-hole) whereby the active ingredients of the composition do not immediately dissolve in the petroleum system but, instead, are gradually released over a period of time. At the same time, the compositions of the invention are particulate solids which are pourable at low ambient surface temperatures.

A further object is to provide paraffin inhibitor compositions and methods for treating high temperature petroleum systems.

Another object is to provide pour point depressant compositions and methods for treating high temperature petroleum systems.

2. Prior Art

Most of the chemical additives, e.g. pour point depressants and paraffin inhibitors, for crude oils make use of long alkyl side chains of from 14 to 30 carbon atoms spaced along a polymeric backbone. These branched chain structures cocrystallize with the paraffin waxes and reduce the size of the crystals and their tendency to form gelled structures and agglomerate on cold surfaces.

For example, French Pat. No. 82811 generally discloses a mixture of polyethylene with certain additives for the stabilization of gasoline.

British Pat. No. 1161188 discloses polymers containing aliphatic side chains of at least 14 carbon atoms formed by the polymerization of unsaturated compounds.

British Pat. No. 1274746 discloses the use of an ester of a copolymer of maleic anhydride and vinyl acetate where the ester is derived from an alcohol containing at least 20 carbon atoms.

U.S. Pat. No. 3,344,859 discloses the use of naphthalene as a paraffin inhibitor. The naphthalene is placed into the formation as a molten liquid but solidifies upon cooling to the formation temperature. The naphthalene then will slowly dissolve in the crude oil and allow a slow release of inhibiting agent.

U.S. Pat. No. 3,454,379 discloses the addition of polyethylene to improve the pumpability of distillate fuel oil.

U.S. Pat. No. 3,531,409 discloses solid solutions of polymers, e.g. polyethylene, with corrosion inhibitors and paraffin removers.

U.S. Pat. No. 3,630,280 discloses a method and composition for treating subterranean formations which consists of placing in the formation a solid mixture of high molecular weight ethylene/vinyl acetate, low molecular weight ethylene/vinyl acetate and a paraffin wax with a melting point between 135° and 170° F. This mixture allows slow controlled oil solubility in formations having temperatures between 125° and 155° F.

U.S. Pat. No. 3,640,824 discloses the use of a mixture of branched polyethylene with a molecular weight greater than 6000 and naphthalene and/or microcrystalline wax and/or asphaltenes as a paraffin inhibitor.

U.S. Pat. No. 3,661,541 discloses mixtures of (1) polymers of ethylene with polar monomers with (2) homopolymers or copolymers of ethylene to improve flow characteristics of distillate petroleum oils.

U.S. Pat. No. 3,879,177 discloses the use of a copolymer of maleic anhydride and vinyl methyl ether esterified with an alcohol containing 18 to 24 carbon atoms to inhibit the crystallization of wax and reduce its deposition on cold surfaces.

U.S. Pat. No. 3,926,579 discloses the use of alpha olefin polymers and copolymers as pour point reducers.

U.S. Pat. No. 4,175,926 discloses a flow improver for wax-containing petroleum light fuel which is a combination of an ethylene polymer and an ester copolymer or olefin polymer.

In addition to the above, numerous patents describe the addition of algaecides, rust inhibitors, corrosion inhibitors, biocides and the like into crude oil petroleum systems.

SUMMARY OF THE INVENTION

Copending application Ser. No. 366,947, filed Apr. 9, 1982 and of common assignment, describes and claims particulate compositions for use at high temperatures in petroleum systems. The compositions comprise an additive (e.g., pour point depressant, paraffin inhibitor) which has been blended with an essentially hydrocarbon soluble polymer material, e.g., low molecular weight linear polyethylene. The resulting homogeneous mixture has a melting point closer to the normally higher melting point of the polyethylene rather than the normally lower melting point of the additive. Accordingly, the composition allows incorporation of additive to the well environment in a form wherein the additive is slowly released at the high temperature of the crude oil, e.g., above about 50° C. and even above about 110° C., i.e., up to about 150° C.

It has now been discovered that the above-described compositions may be improved by encapsulating the mixture described therein with a coating of a high melting, essentially hydrocarbon insoluble polymer which is compatible therewith to afford slower dissolution of the additive into the hot crude oil. Accordingly, the compositions of the present invention comprise a solid, particulate mixture of a petroleum additive and an essentially hydrocarbon soluble polymeric material having a melting point of up to about 150° C., which mixture is coated with an essentially hydrocarbon insoluble polymeric material having a melting point of up to about 150° C. The encapsulating coating of polymer is essentially insoluble in the petroleum system up to at least 100° C., but allows the additive to diffuse through the coating and enter the petroleum system. Thus, the insoluble, high melting point, essentially hydrocarbon insoluble coating functions as a semipermeable membrane which allows diffusion of the additive into the petroleum system in a much slower and more controlled manner than does the uncoated composition.

By virtue of the present invention, low melting point additives may be stored at low ambient surface temperatures without regard to high viscosity and solid heating problems normally attendant thereto and may be incorporated into hot petroleum systems in such a manner that they do not immediately dissolve, as usually happens. Therefore, the additives may be added at infrequent intervals but the effects are long lasting due to the slow, controlled release of additive into the system.

DETAILED DESCRIPTION OF THE INVENTION

Additives

The chemical additives which form one component of the composition of the present invention may be any of the chemical additives normally used in the treatment of petroleum systems and which are compatible with the hydrocarbon soluble polymer component of the composition. The additive may be any one or mixtures of two or more of those additives described above, e.g., paraffin inhibitor, pour point depressant and the like, but is not limited thereto. Obviously the particular function of the chemical additive is not critical with regard to the present invention.

Any suitable amount of chemical additive can be blended with the polymeric material provided the additive performs a desired result in a particular system. In practice, it is desirable to have as much of the chemical additive present as possible, since it is the active ingredient. The polymeric material may be active or inactive. One normally adds as little as possible of the polymeric material, if inactive, consistent with the desired results.

In practice, one may add, based on polymeric material, as little as about 1% or less or up to about 50% or more of the chemical additive by weight.

Polymers

The hydrocarbon soluble polymer component of the composition, with which the additive is mixed, may be any polymer which is compatible with the additive and which has a melting point which is sufficiently high that it will dissolve slowly at the temperature of the petroleum system and thereby gradually release additive. Examples of essentially hydrocarbon soluble polymers with which the additive may be mixed to form a uniform mixture include, in general, natural and synthetic polymers and waxes. Among such materials are polyolefins such as polyethylene, polypropylene, polyisobutylene and polystyrene and polymers such as polyacrylics, polyamides, and any relatively high melting substance in which the additive may be dissolved to form a liquid solution at high temperatures and a uniformly distributed, if not homogeneous, solid solution at temperatures below the melting point of the substance.

The preferred hydrocarbon soluble polymer material is a low molecular weight linear polyethylene or an oxidized or otherwise modified linear polyethylene. Ideal materials suitable for use are POLYWAX ® polyethylenes, ethylene homopolymers produced by Petrolite Corporation. POLYWAX linear polyethylenes are numbered by their approximate molecular weight. These materials exhibit sharp melting points which make them ideal for use in the invention. The following is a list of a few of the available materials.

| NAME | MOLECULAR WEIGHT | MELTING POINT (°C.) |
|---|---|---|
| POLYWAX 500 | 500 | 86 |
| POLYWAX 655 | 700 | 102 |
| POLYWAX 1000 | 1000 | 113 |
| POLYWAX 2000 | 2000 | 125 |

® POLYWAX is a Registered Trademark of Petrolite Corporation.

Additive/Polymer Mixtures

It has been found that relatively small amounts of the above-described polyethylenes, when mixed with lower melting point chemical additives, result in a mixture with a melting point close to that of the polyethylene. This can be accomplished with as little as about 20% polyethylene, which allows a majority of the compound to be the active material. The preferred amount of polyethylene in the composition is from about 20% to about 50% by weight. Quantities higher than about 50% result in mixtures that are less oil soluble, sharper melting and containing lower quantities of the active compound. The use of a polyethylene having a selected melting point and molecular weight can result in mixtures having a variety of melting points for the same active compound.

The additive/polymer mixtures can be prepared by any suitable method. In practice, the chemical additive and the polymeric material are normally heated and mixed above the melting point to yield a uniform or homogeneous solution which can be cooled and converted to particles of any suitable size, such as by grinding, pelleting, prilling or other operation.

The following examples 1-5 illustrate chemical additives which may be used in accordance with the invention.

EXAMPLE 1

Preparation of Chemical Additive

A copolymer of a $C_{20-24}$ alphaolefin and maleic anhydride was prepared by free radical polymerization. The polymerization was carried out with a 1/1 molar ratio. The copolymer was then further reacted with n-behenyl alcohol (2 moles of alcohol per maleic unit) to form a copolymer of alphaolefin and di-n-behenyl maleate. The resulting product had a melting point of 45° C. and is ideally expressed as

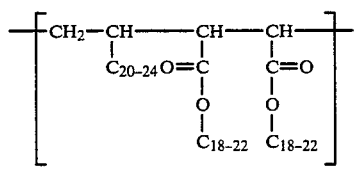

This material is useful as a pour point depressant or paraffin deposition inhibitor, and also can be a viscosity reducer (flow improver). Other uses are also possible.

EXAMPLE 2

Preparation of Chemical Additive

An additive of a $C_{30}+$ alpha olefin and maleic anhydride was prepared by free radical polymerization in a 1/1 mole ratio. The copolymer was then further reacted with 1 mole of octadecyl amine. The resulting product had a melting point of 42° C. and is the imide ideally expressed as

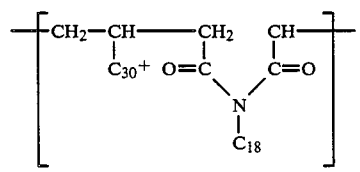

This material is useful as a pour point depressant or paraffin deposition inhibitor. It can also have other uses (viscosity reducer, flow improver, etc.).

In addition to the additives of Examples 1 and 2, a wide variety of additives can be used in the invention. For example, polymers prepared from esters, imides, ester-imides and the like, and mixtures thereof, are useful. Additionally, alcohols and amines can be used to afford derivatives thereof. Following are illustrations of a few types of additives which may be used.

IMIDES

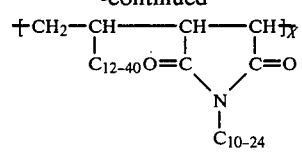

ESTERS

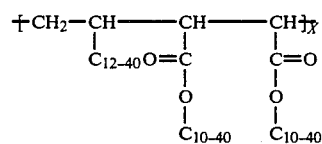

COMBINATIONS OF IMIDES AND ESTERS

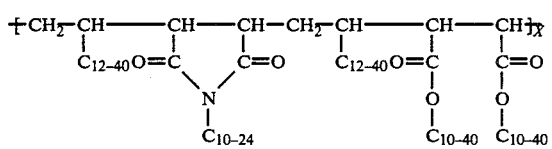

In addition, unreacted anhydrides or acid groups can exist in the polymer structure.

EXAMPLE 3

Preparation of Chemical Additive

A homopolymer of n-behenyl methacrylate was prepared by free radical polymerization. The polymerization step produced a product which had a melting point of 60° C. and is ideally expressed as

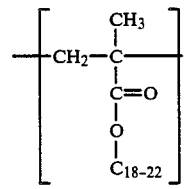

This material is useful as a pour point depressant, paraffin deposition inhibitor, viscosity and yield value reducer (flow improver) and can have various other uses.

EXAMPLE 4

Preparation of Chemical Additive

A homopolymer of methyl acrylate was prepared by free radical polymerization. The product was then transesterified with a mixture of $C_{18}$ to $C_{22}$ alcohols (one half to one mole of alcohol per methyl acrylate unit) to form a mixture of $C_{18}$ to $C_{22}$ esters of polyacrylic acid. The resulting product had a melting point of 50° C. and is ideally expressed as

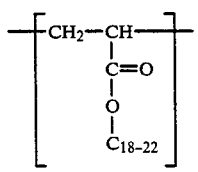

If only one half mole of the above alcohol mixture is used per methyl acrylate unit, the product formed is a copolymer of methyl acrylate and $C_{18}$ to $C_{22}$ acrylates. The resulting product had a melting point of 45° C. and is ideally expressed as

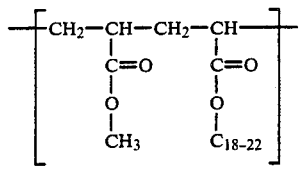

This material is useful as a pour point depressant, paraffin deposition inhibitor, viscosity and yield value reducer, or for a variety of other uses.

EXAMPLE 5

Preparation of Chemical Additive

A homopolymer of ethyl acrylate was prepared by free radical polymerization. The product was then transesterified with a mixture of $C_{18}$ to $C_{22}$ alcohols (one half mole to one mole of alcohol per mole of ethyl acrylate) to form a mixture of $C_{18}$ to $C_{22}$ esters of polyacrylic acid. If one half mole of alcohol is used, the resulting product has a melting point of 47° C. and is ideally expressed as

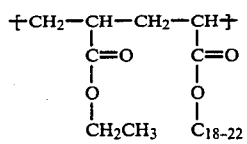

This material is useful as a pour point depressant, paraffin deposition inhibitor, viscosity and yield value reducer and can have various other uses.

The additives which are specifically disclosed and described above are homopolymers or copolymers containing long alkyl side chains of at least 12 carbon atoms. These side chains are generally unbranched and saturated but could be branched and/or unsaturated. The homopolymers and copolymers consist of a main backbone of carbon atoms containing a number of long side chains. These side chains can be attached directly to the backbone or indirectly via one or more oxygen and/or carbon atoms. One example of particular application is attachment of the side chain via a carboxyl group. Such polymers are prepared typically by the polymerization of olefinically unsaturated compounds. These unsaturated compounds can either already contain the long side chains or the side chains can be attached to the polymer backbone during a second reaction. One system of particular interest is the copolymerization of long chain alpha olefins and maleic anhydride. The polymer backbone is then further reacted with a long chain alcohol to form side chains linked via an ester functionality. Additionally, copolymers of other long chain alpha-olefins and unsaturated dicarboxylic anhydrides or acids may be used, as may be the alcohol or amine reaction products thereof. These copolymers are typically of low molecular weight, e.g. 2,000–50,000, and wax-like in nature. It is the physical properties associated with these wax-like polymers, i.e. gelling or solidifying at low temperatures, that make them so difficult to handle in general oilfield usage.

The preferred homopolymer and copolymer additives are prepared from any olefinically unsaturated monomer, or mixture of two or more thereof, having alkyl side chains about 0–100 percent of which are $C_{18}$ or less and about 100–0 percent of which are $C_{18}$ or greater.

Table A lists the characteristics of preferred hydrocarbon soluble ethylene polymers with which the additives are mixed.

TABLE A

| | POLYETHYLENE | | |
|---|---|---|---|
| | BROAD RANGE | INTERMEDIATE RANGE | PREFERRED RANGE |
| Mol. Wgt. | about 200–10,000 | about 500–3,000 | about 1,000–2,000 |
| Melting Point (°C.) | 50–150 | 80–130 | 100–125 |
| Size of particulates (Cm.) | 0.04–1.3 | 0.08–0.64 | 0.16–0.32 |

Table B lists the percent weight ratios of polymer/additive mixtures of the invention.

TABLE B

| PERCENT WEIGHT RATIO OF POLYETHYLENE TO ADDITIVE | | |
|---|---|---|
| RANGE | INTERMEDIATE RANGE | PREFERRED RANGE |
| 5–75% | 10–60% | 20–50% |

Admixture of a discrete amount of the preferred polyethylene with the above-described additives (which have a lower melting point than the polyethylene), results in a mixture having a meling point closer to that of the polyethylene.

EXAMPLE 6

Preparation of Solid Mixtures

Mixtures of various polyethylenes and the additive compounds described in Examples 1 through 5 were prepared by melting the two components and blending at 150° C. Below is a listing of those compounds, their melting points, and the blend melting points:

| | POLYETHYLENE | M.P. (°C.) | WEIGHT % | ADDITIVE | WEIGHT % | BLEND MELT-POINT.°C. |
|---|---|---|---|---|---|---|
| MIXTURE A | POLYWAX 500 | 86 | 20 | Copolymer of Example 1 | 80 | 75 |
| MIXTURE B | POLYWAX 655 | 102 | 20 | Copolymer of Example 1 | 80 | 82 |
| MIXTURE C | POLYWAX 1000 | 113 | 20 | Copolymer of Example 1 | 80 | 99 |
| MIXTURE D | POLYWAX 2000 | 125 | 20 | Copolymer of Example 1 | 80 | 112 |
| MIXTURE E | POLYWAX 500 | 86 | 20 | Copolymer of Example 2 | 80 | 72 |

-continued

| | POLYETHYLENE | M.P. (°C.) | WEIGHT % | ADDITIVE | WEIGHT % | BLEND MELT-POINT.°C. |
|---|---|---|---|---|---|---|
| MIXTURE F | POLYWAX 655 | 102 | 20 | Copolymer of Example 2 | 80 | 80 |
| MIXTURE G | POLYWAX 1000 | 113 | 20 | Copolymer of Example 2 | 80 | 97 |
| MIXTURE H | POLYWAX 2000 | 125 | 20 | Copolymer of Example 2 | 80 | 110 |
| | | | | Copolymer of Example 1 | 100 | 45 |
| | | | | Copolymer of Example 2 | 100 | 42 |
| MIXTURE I | POLYWAX 2000 | 125 | 50 | Copolymer of Example 3 | 50 | 120 |
| MIXTURE J | POLYWAX 2000 | 125 | 50 | Copolymer of Example 4 | 50 | 118 |
| MIXTURE K | POLYWAX 2000 | 125 | 50 | Copolymer of Example 5 | 50 | 115 |

For comparative purposes, the melting points of POLYWAX 500, 655, 1000 and 2000 are, respectively, 86° C., 102° C., 113° C. and 125° C.

These mixtures will gradually dissolve and release the chemical additive in petroleum systems, such as crude oils, which have temperatures from about 50° C. to about the melting point of the mixtures or higher, as shown in Example 7.

EXAMPLE 7

Solubility Tests

Solubility tests were run at various temperatures for each of the prepared mixtures. A solid, one gram piece of the treating mixture was placed in a mixture of 80% kerosene and 20% mineral oil. Each piece measured about 1 cc in volume. Twenty ml. of fluid volume were used. Each sample was allowed to stand at a given temperature 24 hours before the temperature was increased by 10° C. Table I indicates the degree of solubility during the 24 hour period.

TABLE I

| | SOLUBILITY STUDY | | | | | | |
|---|---|---|---|---|---|---|---|
| EXAMPLE | 60° C. | 70° C. | 80° C. | 90° C. | 100° C. | 110° C. | 120° C. |
| Mixture A | PS | S | | | | | |
| Mixture B | I | PS | S | | | | |
| Mixture C | I | I | PS | PS | S | | |
| Mixture D | I | I. | I | I | PS | S | |
| Mixture E | PS | S | | | | | |
| Mixture F | I | PS | S | | | | |
| Mixture G | I | I | PS | PS | S | | |
| Mixture H | I | I | I | PS | PS | S | S |
| Mixture I | I | I | I | I | PS | PS | S |
| Mixture J | I | I | I | I | PS | PS | S |
| Mixture K | I | I | I | I | PS | PS | S |

I = Insoluble, less than 5% loss in 24 hours
PS = Partially soluble, between 5 and 90% loss in 24 hours
S = 90-100% soluble in 24 hours Hydrocarbon Insoluble Polymeric Coating In order to afford the release of the chemical additive over a longer period of time, the mixture of chemical additive and polyethylene, for example, was first prilled to obtain pellets of about 6-12 mesh size. These pellets were spray coated by a conventional coating process, such as a coating pan and sprayer or a fluidized bed process. The polymer which is used to coat the mixtures may be any high melting polymer which is compatible with said mixture and which is essentially insoluble in petroleum systems or aqueous systems up to temperatures of 100°-150° C. In practice, a suitable coating material, for example an acrylic lacquer, is diluted with suitable solvents (acetone, ethyl acetate) to give a liquid solution of the coating material. This liquid solution is sprayed on the pellets to give a thin, fairly uniform coating which, when dry, encapsulates the mixture. The coated pellets can then be placed in a petroleum system which requires treatment, e.g., for paraffin inhibition or pour point reduction. The coating functions as a semipermeable membrane by limiting intrusion by the oil and by slowing down or limiting the escape of chemical additive molecules into the petroleum system. Thus, the coating itself does not dissolve, as in pharmaceutical applications, but, instead provides a controlled diffusion of chemical additive molecules into the petroleum system. This slow release of additive allows the coated pellets to effectively deliver the chemical additive into the system over a period of several weeks to several months or longer. The coating may eventually dissolve very slowly over a long period of time. Polymers which may be used as coatings include any commonly accepted lacquer or resin type material which is essentially or substantially insoluble in hydrocarbon systems and is similarly insoluble in aqueous systems. A modicum of experimentation may be necessary to choose the exact coating material for a particular application.

The polymers used as coatings herein may include, but are not limited to, nitrocellulose lacquers, acrylonitrile copolymers, acrylic homopolymers or copolymers, vinyl acetate copolymer resins, and any similar lacquer-like material.

Preferred coatings are fairly high molecular weight acrylic polymers which are used in acrylic lacquers for special coating applications, such as methylmethacrylate homopolymers or copolymers of methylmethacrylate with ethyl acrylate or any similar monomer.

It must be understood that, in practice, it is possible to control the slow release of chemical additive by varying the thickness of the coating material. The thickness for uses described herein is adequately controlled by simply controlling the weight percent of coating material applied to the pellets. The coating material may comprise from about 1 to about 20% of the final coated pellet weight. The preferred weight percent of coating is about 5-15% of the final pellet weight. A greater amount of coating will give a slower release of the encapsulated chemical additive.

It is to be understood that specific compositions of additive, polymers and coatings, other than those set forth herein, will require a modicum of experimentation within the skill of those practiced in the art.

The following examples illustrate certain specific embodiments of the best mode of practice of the invention. The examples are illustrative only and are not intended as a limitation of the scope of the invention.

EXAMPLE 8

A 50/50 (by weight) mixture of a paraffin inhibitor additive (imide-ester blend) with POLYWAX 1000 was made by melting the components and blending at 150° C. The mixture was pelletized in a prilling tower to afford approximately 2–3 mm prills. The pellets were spray coated with a methylmethacrylate solution (polymethylmethacrylate in a mixture of acetone, ethyl acetate, and various other solvents designed to control the drying process).

After immersion in kerosene for 24 hours at 65.6° C., the coated pellets retained 80–90% of their weight. They retained nearly 60% of their weight after three days immersion.

EXAMPLE 9

Pellets, 1 gm, prepared as in Example 5 but not coated, were placed in 100 gms kerosene in a constant temperature bath (65.6° C.). After the test time had been completed, the resulting solution was filtered and the pellets that remained were dried in a 150° C. oven for one hour to remove any kerosene. The final weight of the pellets divided by the initial weight times 100 gives the percent weight retention.

TABLE II

| PERCENT WEIGHT RETENTION* | | | | |
|---|---|---|---|---|
| | 24 Hours | 3 Days | 4 Days | 1 Week |
| Uncoated Pellets | 60% | 50% | 45% | 40% |
| Coated Pellets | 90% | 60% | 55% | 50% |

*Averages of at least 10 runs. A ±5% variation can exist in any given number.

EXAMPLE 10

A 50/50 mixture of paraffin inhibitor additive (imide-ester blend) with POLYWAX 1000 was made as in Example 8. A sample of uncoated pellets was retained for testing. The remaining pellets were loaded into a 122 cm. stainless steel pharmaceutical coating pan and were spray coated with an acrylic lacquer (methylmethacrylate homopolymer solution as described previously). The pellets were table-coated and the coating was allowed to dry while the pellets continued to tumble to allow particle-to-particle transfer to obtain a uniform coating. The theory and mechanics of the coating process are well known to those versed in the art. The lacquer-coated pellets were then compared to the uncoated pellets in the following manner:

1. A crude oil was selected which responded to the particular chemical additive in the pellets. Response was measured by pour point depression of the crude oil by ASTM D-97. The amount (parts per million, PPM) of chemical additive added to the crude oil could be determined by measuring the pour point of the treated crude. Table III shows this relationship.

TABLE III

| PPM of Chemical Additive | Pour Point of Crude Oil (°C.) |
|---|---|
| 0 | 23.9 |
| 25 | 21 |
| 50 | 21 |
| 75 | 18.3 |
| 100 | 18.3 |
| 125 | 18.3 |
| 150 | 12.8 |
| 175 | 10 |
| 200 | 10 |
| 400 | 4.4 |
| 600 | 4.4 |
| 800 | −1 |
| 1000 | −1 |

Thus, it could be determined, by running a pour point test, how much chemical additive (ppm vol/vol) was present in a particular crude oil sample.

2. 150 gram crude oil samples were heated to 65.6° C. Then 0.3 gram of pellets (1000 ppm active component based on oil) was placed in the crude oil for one hour. After one hour of exposure, the pellets were removed and placed in a second 150 g crude oil sample. Meanwhile, 40 ml of oil were removed from the first container and a pour point was run. Thus, it was possible to follow the release of chemical additive over time by successively transferring the same pellets to new containers of oil. Both coated and uncoated pellets were run for comparison. The results are shown in TABLE IV.

TABLE IV

| | | (Blank Oil pour point 23.9° C.) | |
|---|---|---|---|
| LENGTH OF TIME PELLETS WERE KEPT IN CRUDE OIL | LENGTH OF TIME PELLETS WERE PREVIOUSLY USED | POUR POINT OF OIL (°C.) AFTER TREATMENT WITH: | |
| | | COATED PELLETS | UNCOATED PELLETS |
| One hour | 0 | 18.3 | 1.7 |
| " | 1 hour | 18.3 | 18.3 |
| " | 2 hours | 18.3 | 18.3 |
| " | 3 hours | 18.3 | 18.3 |
| " | 4 hours | 18.3 | 21 |
| " | 5 hours | 18.3 | 21 |
| One hour | 6 hours | 18.3 | 21 |
| Two hours | 9 hours | 15.6 | 18.3 |
| " | 11 hours | 15.6 | 18.3 |
| Seventeen hours | 13 hours | 4.4 | 18.3 |
| Seven hours | 30 hours | 7.2 | 21 |

3. Comparison of TABLE IV with TABLE III shows that:

a. Uncoated pellets are most effective in the first test only. They release most of their chemical additive during the first hour to give a low pour point. When the pellets continued to be used on successive oil samples they show 18.3°–21° C. pour points corresponding to only 25–75 ppm of additive.

b. Coated pellets did not show the initial performance surge. Instead, they showed 18.3° C. pour point oil indicating about 75 ppm of chemical being released each hour. The two hour tests showed a 15.6° C. pour point or 100–125 ppm of chemical.

c. After being used for eleven hours in several tests, the same pellets were left in fresh oil samples for 17 hours. The coated pellets supplied 400–600 ppm of additive, (4.4° C. pour point) while the uncoated supplied 75 ppm of additive (18.3° C. pour point).

d. After 7 additional hours, the same trend was seen.

e. Thus, uncoated pellets release most of their chemical additive when first placed in the oil. Coated pellets show a slow, controlled release of additive and even after 30 hours of use, still released significant amounts of chemical additive.

EXAMPLE 11

Since coated pellets showed a slower release of additive in the lab, a field test was run on two oil wells which, on the average, experienced paraffin deposition problems every 3 to 4 months. Lab tests were run on the same crude oil to show that the additive used would be an effective paraffin deposition inhibitor. The coated pellets were introduced into the wells in acid fracturing treatments in July and August, 1983. The July treatment was still working after nine months, the August-treated well was still working after eight months. Thus, using coated pellets in a fracturing treatment extends treatment. The coated pellets are trapped in the formation with the frac sand and oil passes the pellets on the way to the wellbore. However, a small amount of chemical additive slowly diffuses from the pellets and enters the oil as evidenced by:

1. No paraffin plugging problems after eight to nine months.

2. Oil samples were taken from the flowline six to seven months after pellets were placed in the well with the frac job. Pour points showed 200–300 ppm of chemical in the oil.

Thus, the coated pellets released chemical additive slowly, but effectively, over an extended period of time. It is not yet known how long the pellets will actually last in the system but, so far, they have doubled the trouble-free time from about 4 months to about 8 months.

As mentioned above, this invention relates to compositions which may contain a variety of additives having diverse functions. The invention has been specifically described as it relates to additives for high temperature petroleum systems. Thus, the compositions make use of a blend of a hydrocarbon soluble linear polyethylene, or functionally equivalent polymer, of high melting point and a normally lower melting point, waxy pour point depressant or paraffin inhibitor additive as a homogeneous mixture in particulate form. The particle blend is then coated with an essentially hydrocarbon insoluble, high melting point polymer and added to the formation well bore or flowline in the form of discrete solid particles which are very slowly oil soluble to afford a crude oil with improved pour point and viscosity and with inhibition of paraffin deposition.

While the illustrative embodiments of the invention have been described here and above with particularity, it will be understood that various other modifications will be apparent to and can be readily made by those skilled in the art without departing from the spirit and scope of the invention. Accordingly, it is not intended that the scope of the claims appended hereto be limited to the examples and description set forth herein but rather that the claims be construed as encompassing all the features of patentable novelty which reside in the present invention, including all features which would be treated as equivalents thereof by those skilled in the art to which the invention pertains.

I claim:

1. A petroleum system containing a solid, particulate composition comprising a solid mixture of a chemical additive which is a low-molecular weight polymer or mixture of polymers containing side chains of at least 12 carbon atoms and an essentially hydrocarbon soluble polymer compatible therewith, said solid mixture having a melting point of above about 50° C. to about 150° C. and having an encapsulating coating thereon which is a high melting point, essentially hydrocarbon insoluble polymer compatible therewith.

2. System of claim 1 wherein said additive is a pour point depressant compound.

3. System of claim 1 wherein said additive is a paraffin inhibitor compound.

4. System of claim 1 wherein said additive is a flow improver compound.

5. System of claim 1 wherein said hydrocarbon soluble polymer is polyethylene.

6. System of claim 1 wherein said hydrocarbon insoluble polymer is an acrylic polymer.

7. Process of treating a petroleum system which comprises adding thereto an effective amount of a solid mixture of a chemical additive which is a low-molecular weight polymer or mixture of polymers containing side chains of at least 12 carbon atoms and an essentially hydrocarbon soluble polymer compatible therewith, said solid mixture having a melting point of above about 50° C. to about 150° C. and having an encapsulating coating thereon which is a high melting point, essentially hydrocarbon insoluble polymer compatible therewith.

8. Process of claim 7 wherein said additive is a paraffin inhibitor compound.

9. Process of claim 7 wherein said additive is a pour point depressant compound.

10. Process of claim 7 wherein said additive is a flow improver compound.

11. Process of claim 7 wherein said hydrocarbon soluble polymer is polyethylene.

12. Process of claim 7 wherein said hydrocarbon insoluble polymer is an acrylic polymer.

* * * * *